United States Patent
Vuojamo

(10) Patent No.: US 8,113,230 B2
(45) Date of Patent: Feb. 14, 2012

(54) SIMPLE AXIAL LOCKING OF A VALVE SHAFT

(75) Inventor: Terho Vuojamo, Helsinki (FI)

(73) Assignee: Metso Automation Oy, Helsinki (FI)

( * ) Notice: Subject to any disclaimer, the term of this patent is extended or adjusted under 35 U.S.C. 154(b) by 323 days.

(21) Appl. No.: 12/311,965

(22) PCT Filed: May 19, 2008

(86) PCT No.: PCT/FI2008/050281
§ 371 (c)(1),
(2), (4) Date: Apr. 21, 2009

(87) PCT Pub. No.: WO2008/145810
PCT Pub. Date: Dec. 4, 2008

(65) Prior Publication Data
US 2010/0024900 A1    Feb. 4, 2010

(30) Foreign Application Priority Data
Jun. 1, 2007 (FI) .................................. 20070433

(51) Int. Cl.
*F16K 5/08* (2006.01)
(52) U.S. Cl. ........ 137/385; 251/292; 251/305; 251/309; 251/315.14
(58) Field of Classification Search ................ 137/385; 251/292, 304, 305, 315.01, 315.14, 309
See application file for complete search history.

(56) References Cited

U.S. PATENT DOCUMENTS

| | | | |
|---|---|---|---|
| 3,155,368 A * | 11/1964 | Shafer | 251/175 |
| 3,157,190 A | 11/1964 | Allen | |
| 3,760,836 A * | 9/1973 | Albanese | 137/360 |
| 3,767,162 A | 10/1973 | Olsson | |
| 3,940,107 A | 2/1976 | Allenbaugh, Jr. | |
| 4,175,580 A | 11/1979 | Kalbfleisch | |
| 4,218,042 A * | 8/1980 | Eckel | 251/288 |
| 4,336,919 A | 6/1982 | Hall | |
| 4,467,823 A | 8/1984 | Shaffer et al. | |
| 4,475,712 A | 10/1984 | DeJager | |
| 4,480,813 A * | 11/1984 | Holley | 251/288 |
| 4,480,814 A * | 11/1984 | Vinciguferra | 251/292 |
| 5,127,628 A * | 7/1992 | Kemp | 251/315.16 |
| 5,529,285 A * | 6/1996 | McKnight et al. | 251/315.14 |
| 5,906,354 A * | 5/1999 | Gilbert et al. | 251/214 |
| 5,941,266 A * | 8/1999 | Henwood | 137/15.22 |
| 6,202,668 B1 * | 3/2001 | Maki | 137/72 |
| 6,971,633 B2 * | 12/2005 | Gillen | 251/315.07 |
| 2002/0145126 A1 * | 10/2002 | Lian | 251/315.14 |
| 2006/0180218 A1 | 8/2006 | Gruener, Sr. | |
| 2007/0251577 A1 * | 11/2007 | Furnival | 137/315.18 |

FOREIGN PATENT DOCUMENTS

| | | |
|---|---|---|
| GB | 636601 | 5/1950 |
| GB | 1 256 727 | 12/1971 |
| WO | WO 2007/022721 A1 | 3/2007 |

* cited by examiner

*Primary Examiner* — John Bastianelli
(74) *Attorney, Agent, or Firm* — Oliff & Berridge, PLC

(57) ABSTRACT

An axial locking of a valve shaft to be non-turnably attached to a closing element of a valve, an end of the shaft to be attached to the closing element being machined on two opposite sides in order to fit into a pivot recess formed in the outer perimeter of the closing element. A collar part is provided to be fitted to the end of the shaft and to be turned into a locking position, one of the end surfaces of the main part of said collar part having at least one axial projection that fits into the pivot recess of the closing element of the valve when the collar part is in the locking position and the end of the shaft is positioned into the pivot recess of the closing element.

8 Claims, 5 Drawing Sheets

SIMPLE AXIAL LOCKING OF A VALVE SHAFT

CROSS-REFERENCE

This is a National Stage Application of International Application No. PCT/FI2008/050281 which was filed on May 19, 2008 claiming the conventional priority of Finnish Patent Application No. 20070433 filed on Jun. 1, 2007.

BACKGROUND

The present invention concerns axial locking of a valve shaft to be non-turnably attached to a closing element of a valve, wherein an end of the shaft to be attached to the closing element has been machined on two opposite sides to fit into a pivot recess formed in the outer perimeter of the closing element.

Since overpressure is predominant in the valve housing, the valve shaft tends to push out from the valve housing in the axial direction. To prevent this from occurring, various solutions have been devised that succeed in preventing the valve shaft from pushing out from the valve housing in the axial direction, but these either require a lot of components and difficult additional working phases or the manufacture of them is uneconomical in terms of material consumption. Further, with these solutions, assembling of the valve requires additional arrangements in the structure of the valve housing which can, in turn, cause additional problems.

One known locking solution is based on the use of a shouldered shaft. When fabricating such a shaft the billet used has to be at least as thick as the diameter of the shoulder. This solution is uneconomical in terms of material consumption. In addition, mounting of such a spindle into the valve requires special arrangements in the valve housing, which further increases the manufacturing costs and the risk of leakage. According to one alternative, the valve housing is provided with a cover sleeve which is slid upon the shaft from the outside, for which cover sleeve, the valve housing has to be provided with an opening having a seal, onto which opening the cover sleeve is fastened by screws. This solution increases the manufacturing costs considerably and increases the risk of leakage of the valve. In an alternative, somewhat more economical solution, the valve housing is provided with a bottom plug, through which the shouldered valve shaft is mounted in place. The solution utilizing a bottom plug also increases manufacturing costs and the risk of leakage.

Further, a solution has been proposed wherein a shouldered valve shaft is made sufficiently short for mounting via a port. Hereby no additional openings are necessary in the valve housing itself, but a shaft coupling and an extension part increasing the costs must be installed on the outer end of the valve shaft. This solution causes looseness of the shaft structure, which has negative effects on the operation of the valve, especially if the valve shaft is coupled to a sensitive control device.

According to another solution for axial locking of a valve shaft, a locking part is slid onto the top of the shaft after the end of the valve shaft has been passed into the valve housing via a borehole for the shaft, the locking part being locked in place by means of a closure pin. The closure pin is an additional part of the structure, further requiring a transversal through hole in the end of the shaft and in the locking part. All this increases the manufacturing costs, which circumstance is of importance especially in mass production.

SUMMARY

The object of the present invention is to overcome the abovementioned drawbacks. This is achieved by means of an axial locking, characterized by a collar part to be fitted to said end of the shaft and to be turned into a locking position, one of the end surfaces of said collar part having at least one axial projection that fits into the pivot recess of the closing element of the valve when the collar part is in its locking position and the end of the shaft is positioned into the pivot recess of the closing element. Said projection prevents the collar part from rotating around the shaft, after the end of the shaft and the projection have been passed into the pivot recess of the closing element, securing it reliably into the locked position.

The main portion of the collar part is provided with a central hole with a cross sectional form permitting reception of the machined end of the shaft when the shaft and the collar part are in a particular mutual position, and on the perimeter of the shaft, at the inner portion of the machined end, there is a circular groove having a width corresponding to the length of the main portion of the collar part and a depth permitting rotation of the collar part. The central hole of the collar part has preferably a cross sectional form of a circle, flattened from two opposite sides, and the inner diameter of the circular groove on the perimeter of the shaft corresponds to the minimum distance between the two opposing walls of the central hole of the collar part, so that the collar part can be rotated around the shaft. The collar part reaches maximal locking when rotated approximately 90° about the axis to either direction from the starting position.

The end surface of the collar part advantageously includes two projections located at the portions where the form of the cross section of the central hole diverges from circular, i.e. at the flattened portions. Hereby both projections help to keep the collar part in a locked position, when the end of the shaft and said projections are pushed into the pivot recess formed in the peripheral surface of the closing element.

The projections on the end surface of the collar part preferably have a shape of a circular segment and are located so that their outer perimeter conjoins with the outer perimeter of the collar part and the diameter of the inner perimeter of the projections matches the diameter of the outer perimeter of the shaft. The end surfaces of the two circular segments are advantageously parallel, and the distance between the end surfaces of the two circular segments corresponds to the width of the pivot recess of the closing element. Consequently, both circular segments will pass, on opposing sides of the valve shaft form-fit into the pivot recess, when the end of the shaft has been placed into said pivot reces of the closing element and the collar part has been turned into its locking position.

The closing element of the valve could be, for example, the ball of a ball valve, the ball segment of a segment valve, the flap of a flap valve, or the plug of a plug valve.

BRIEF DESCRIPTION OF THE DRAWINGS

The present invention will be described in more detail below with reference to the enclosed drawings, wherein.

DETAILED DESCRIPTION OF EMBODIMENTS

Figure 1:
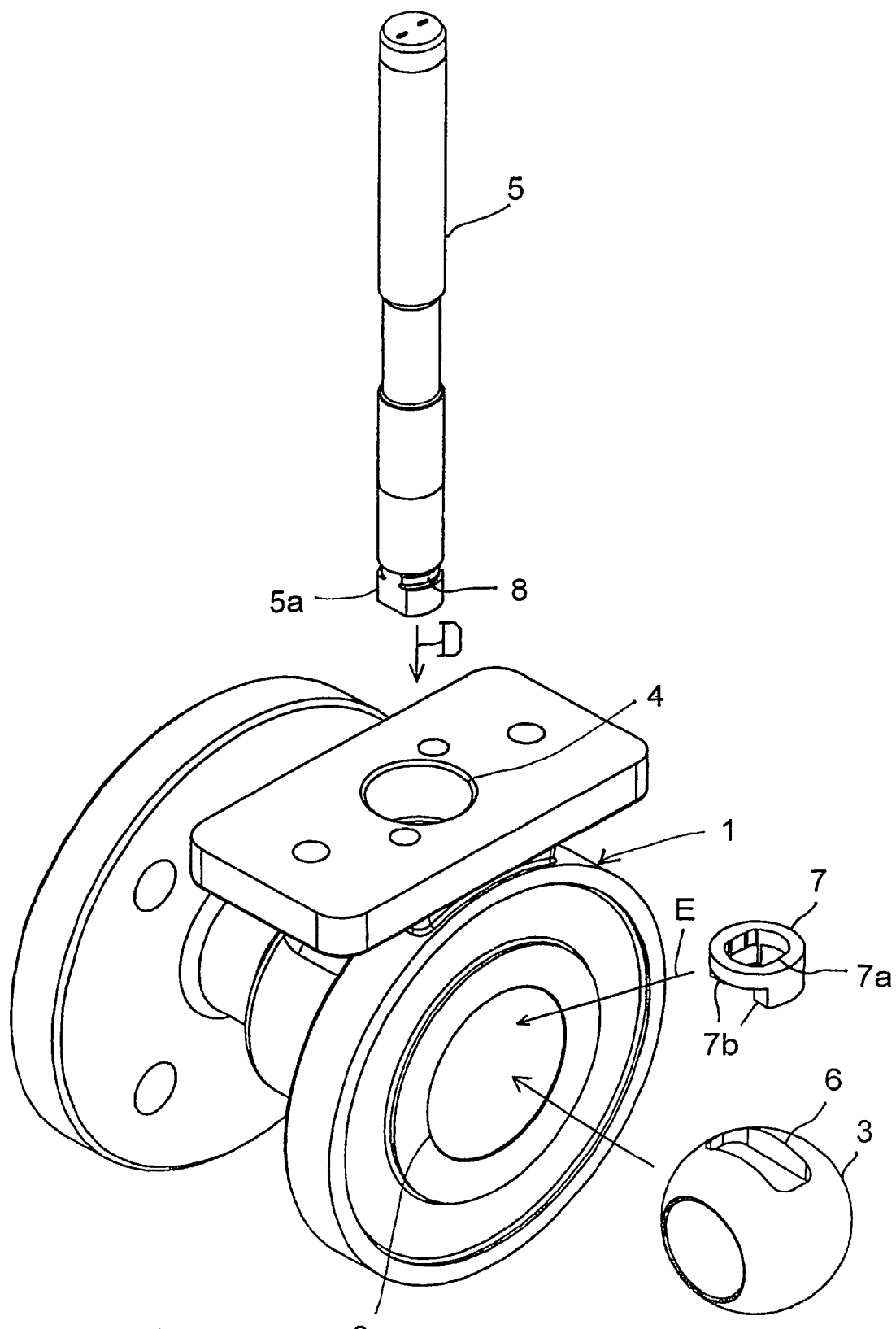
FIG. 1 illustrates an exemplary ball valve provided with an axial locking according to the present invention, prior to mounting of the valve shaft and the ball.

FIG. 1 illustrates a ball valve provided with an axial locking according to the present invention prior to mounting of the components. A valve housing 1 includes a through flow channel 2, into which a flow controlling closing element 3 can be turnably mounted. A shaft bore 4, terminating perpendicularly into the flow channel 2, has been formed in the valve housing 1, to accommodate a valve shaft 5 to be non-turnably attached to the closing element 3 of the valve. An elongated pivot recess 6 with parallel side walls has been formed into the peripheral surface of the closing element 3, into which the end 5a of the valve shaft 5 can be fitted. For this purpose, two opposite sides of the end 5a of the valve shaft 5 are machined flat so that the machined portions fit precisely between the parallel side walls of said pivot recess 6 of the closing element 3.

Figure 2:
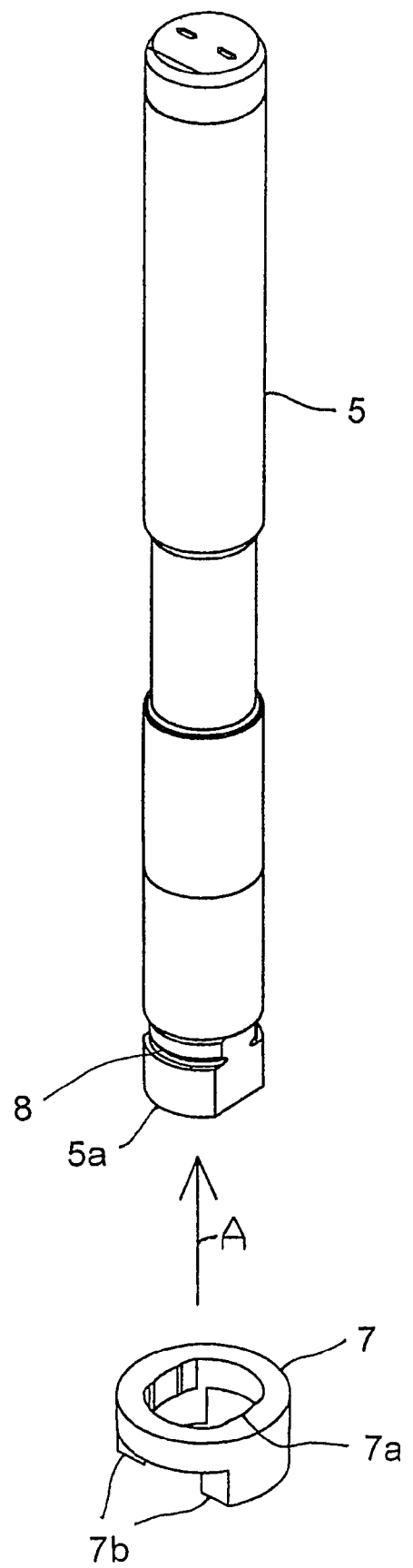
FIG. 2 illustrates the valve shaft and the collar part prior to their conjoining.
Figure 3:
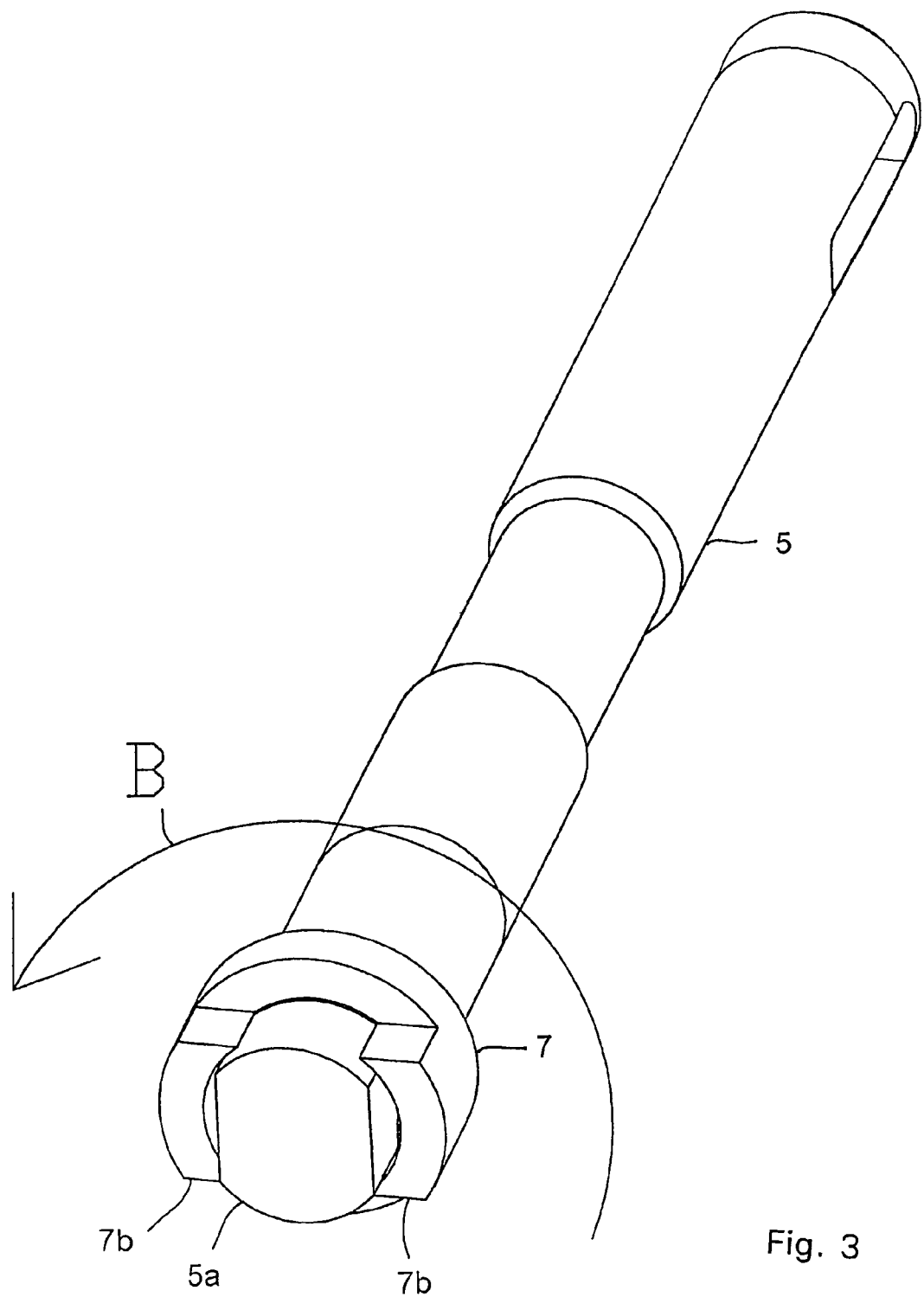
FIG. 3 is a perspective view of the valve shaft and the collar part, the latter being passed over the machined end of the shaft.

According to the present invention, the axial locking of the valve shaft 5 is implemented by means of a collar part 7, which can be passed onto the machined end 5a of the valve shaft 5 (arrow A, FIG. 2) and can be turned there to a locking position (arrow B, FIG. 3). A main portion of the collar part 7 includes a central hole 7a formed so that it can receive the machined end 5a of the valve shaft 5 when the shaft 5 and the collar part 7 are in a specific mutual position. A circular groove 8 with a width corresponding to the length of the main portion of the collar part 7 has been formed on the perimeter of the valve shaft 5, on the inner portion of the machined end 5a of the shaft, with an inner diameter corresponding to the minimum distance between the two opposing walls of the central hole 7a of the collar part 7. Because of this circular groove 8, the collar part 7 may be rotated around the valve shaft 5 when it has been pushed to the inner end of the machined portion of the end 5a of the shaft. When the collar part 7 is turned 90° from the position shown in FIG. 3, for example, in the direction given by arrow B, to the position shown in FIG. 4, the circular groove 8 locks the collar part 7 in the axial direction.

Figure 5:
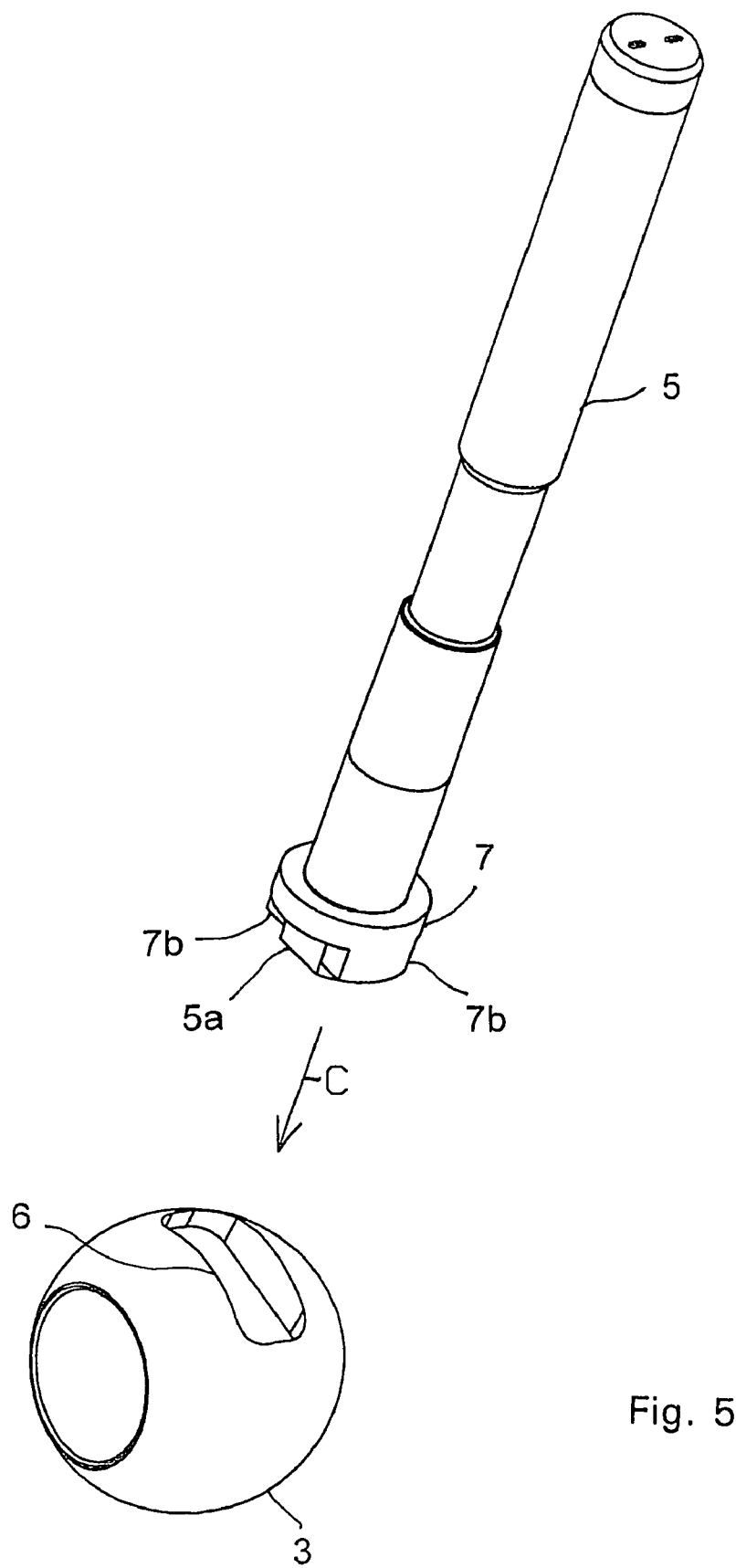
FIG. 5 is a principal drawing illustrating the principle for fitting the valve shaft and the collar part in the pivot recess formed into the perimeter of the ball of the valve.

In order to ensure that the collar part 7 stays in the locked position when the end 5a of the valve shaft has been passed into the pivot recess 6 of the closing element 3, two axially projecting projections 7b, shaped as circular segments, are provided on the end surface of the collar part 7 which faces the end 5a of the shaft, on opposite sides of the central hole 7a, located at the points where the form of the central hole 7a diverges from circular, wherein the outer perimeter of the projections conjoins with the perimeter of the main portion of the collar part 7 and the diameter of the inner perimeter of the projections 7b matches the diameter of the outer perimeter of the shaft 5. The end surfaces of said circular segments 7b are parallel and the distance between the end surfaces of the two circular segments 7b corresponds to the width of the pivot recess 6 of the closing element 3. When the end 5a of the valve shaft is pushed into the pivot recess 6 of the closing element 3 as illustrated by arrow C in FIG. 5, also the projections of the collar part 7 are pushed into the pivot recess 6 of the closing element 3 locking the collar part 7 in its locking position.

Figure 4:
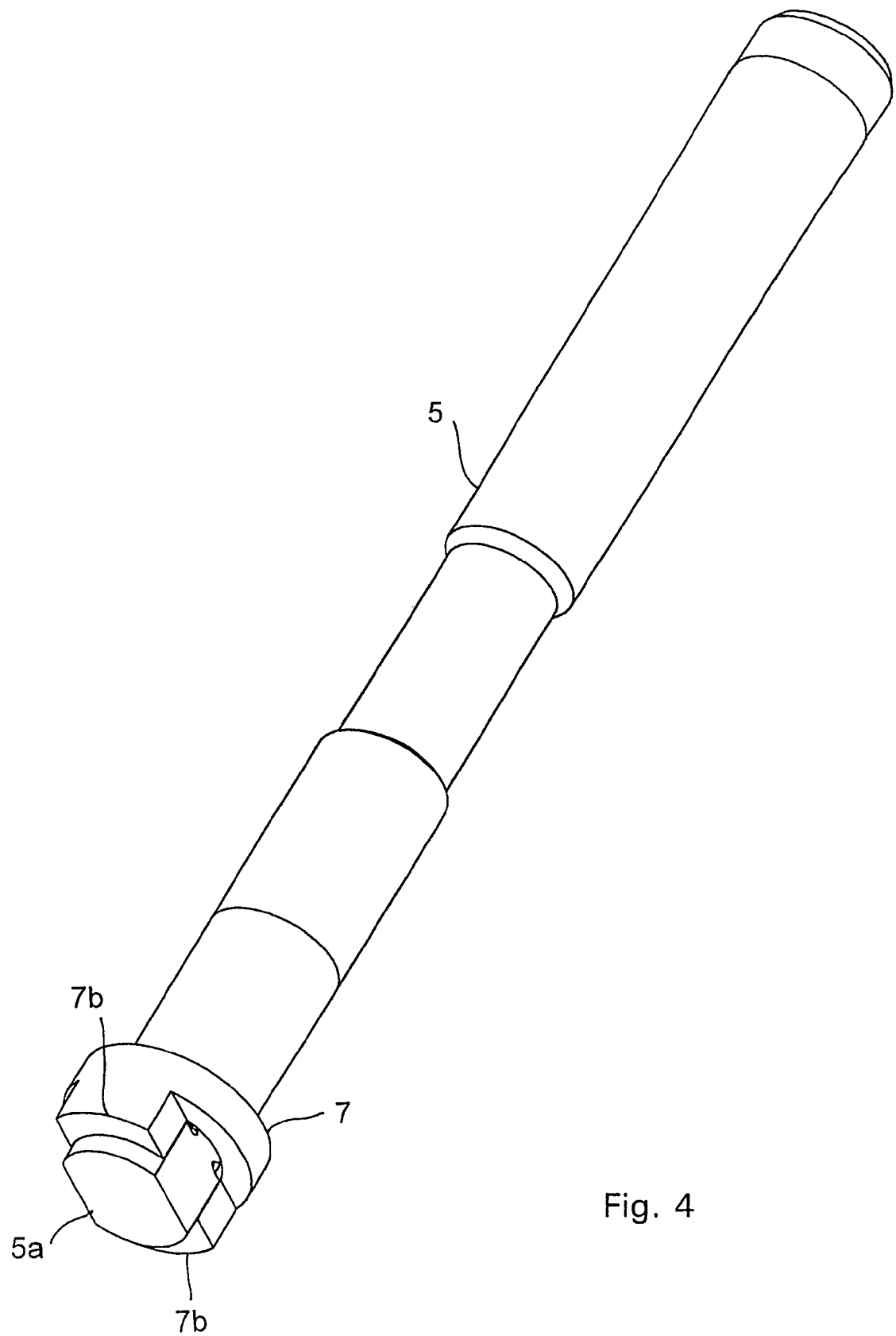
FIG. 4 is a perspective view of the valve shaft and the collar part, the latter being turned into its locking position.

When assembling the ball valve 1, the valve shaft 5 is passed, as illustrated by arrow D of FIG. 1, from the outside through the shaft bore 4 formed in the wall of the valve housing 1 into the flow channel 2, and the collar part 7 is passed, as illustrated by arrow E of FIG. 1, into the valve housing 1 via the flow channel 2, where it is passed onto the end of the shaft, as illustrated by arrow A of FIG. 2, to the position shown in FIG. 3, and is turned, as illustrated by arrow B of FIG. 3, to the locked position shown in FIG. 4, after which the valve shaft 5 is pulled outwards in the shaft bore 4 until the upper end surface of the collar part 7 meets a bottom surface (not shown) of a cavity surrounding the shaft boring formed in the wall of the flow channel. Next, the closing element is passed into the valve housing 1 via the flow channel 2, whereby the end 5a of the valve shaft and the projections 7b of the collar part 7 slide into the pivot recess 6 of the closing element 3, whereby the pivot recess 6 prevents any lateral movement of the projections 7b of the collar part 7 and hence makes sure that the collar part 7 stays securely in locked position during operation.

The invention claimed is:

1. An axial locking of a valve shaft to be non-turnably attached to a closing element of a valve, an end of the shaft to be attached to the closing element being machined on two opposite sides in order to fit into a pivot recess formed in an outer perimeter of the closing element, wherein:
   a collar part is provided to be fitted to the end of the shaft,
   a main portion of the collar part includes a central hole having a cross sectional form that permits reception of the machined end of the shaft in a particular mutual position of the shaft and the collar part, and
   on the outer perimeter of the shaft, at an inner portion of the machined end, there is a circular groove having a width corresponding to a length of the main portion of the collar part and a depth permitting rotation of the collar part to be turned into a locking position, one of the end surfaces of the main part of the collar part having at least one axial projection that fits into the pivot recess of the closing element of the valve together with the machined end of the shaft with the collar part in the locking position.

2. The axial locking according to claim 1, wherein the end surface of the collar part includes two projections located at portions where the form of the cross section of the central hole diverges from circular.

3. The axial locking according to claim 1, wherein the collar part has two axial projections that fit into the pivot recess of the closing element of the valve together with the machined end of the shaft with the collar part turned into the locking position, and
   each projection has a form of a circular segment, having an outer perimeter conjoining with the outer perimeter of the collar part, and an inner perimeter with a diameter matching a diameter of the outer perimeter of the shaft.

4. The axial locking according to claim 3, wherein end surfaces of the two circular segments are parallel and a distance between the end surfaces of the two circular segments corresponds to a width of the pivot recess of the closing element.

5. The axial locking according to claim 1, wherein the closing element of the valve is a ball.

6. The axial locking according to claim 1, wherein the closing element of the valve is a ball segment.

7. The axial locking according to claim 1, wherein the closing element of the valve is a flap.

8. The axial locking according to claim 1, wherein the closing element of the valve is a plug.

* * * * *